Sept. 1, 1964   J. F. HUTTER ETAL   3,146,680
HYDRAULICALLY CONTROLLED AIR CYLINDER
Filed Feb. 13, 1961   3 Sheets-Sheet 1
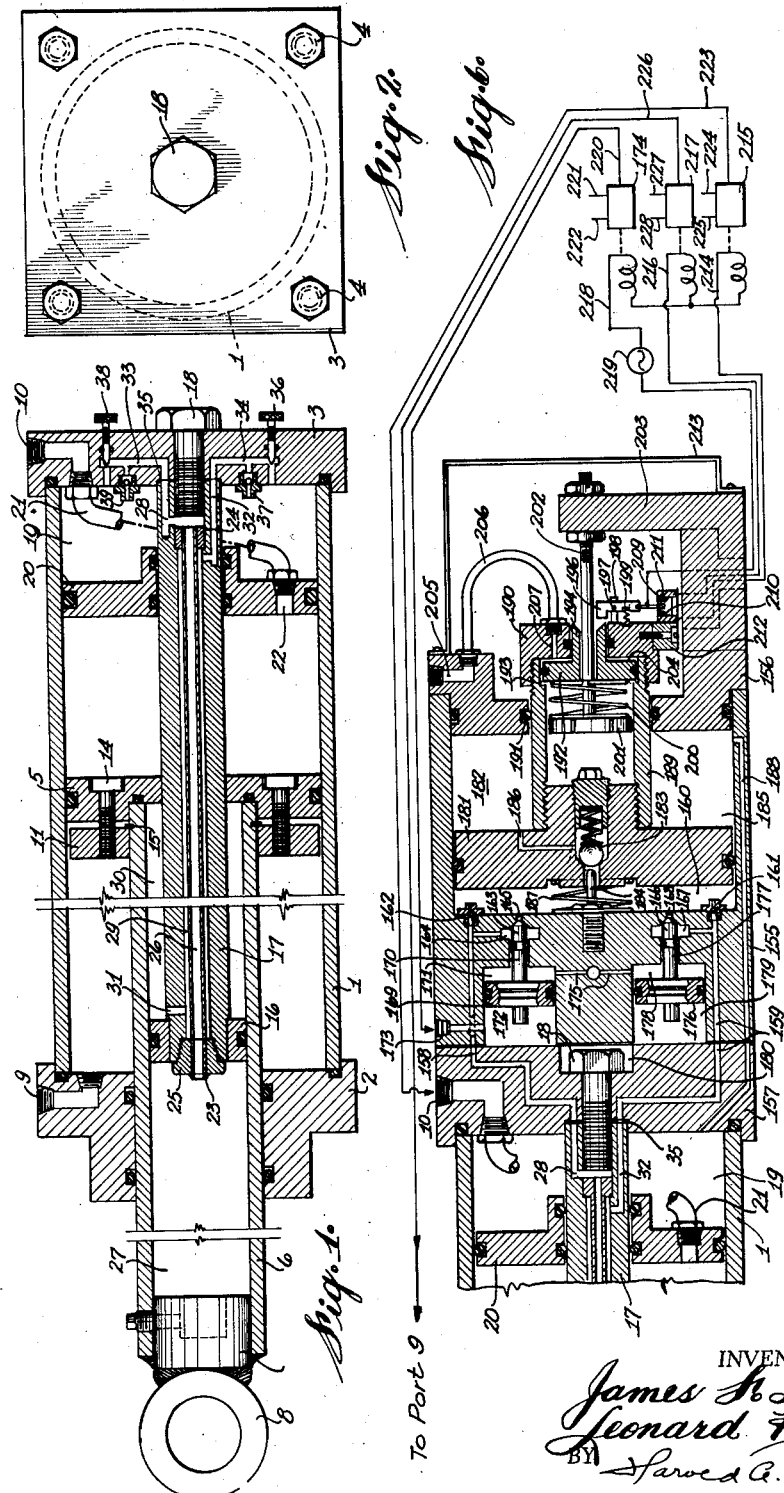
INVENTOR
James F. Hutter
Leonard Kelly
BY Harold A. Weir
ATTORNEY Sept. 1, 1964 J. F. HUTTER ETAL 3,146,680
HYDRAULICALLY CONTROLLED AIR CYLINDER
Filed Feb. 13, 1961 3 Sheets-Sheet 2
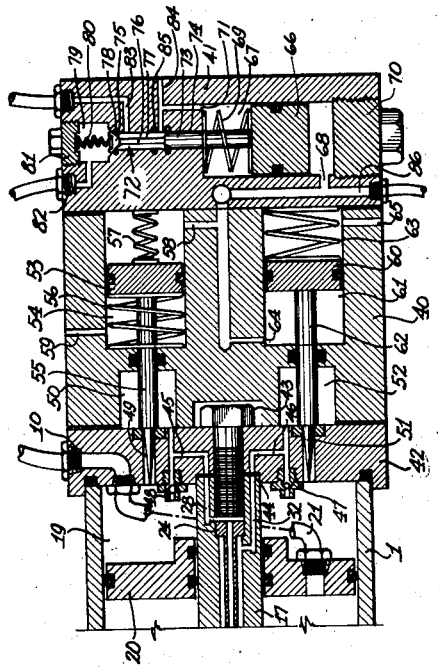
INVENTOR
James F. Hutter
Leonard Kelly
BY Harold G. Weir
ATTORNEY

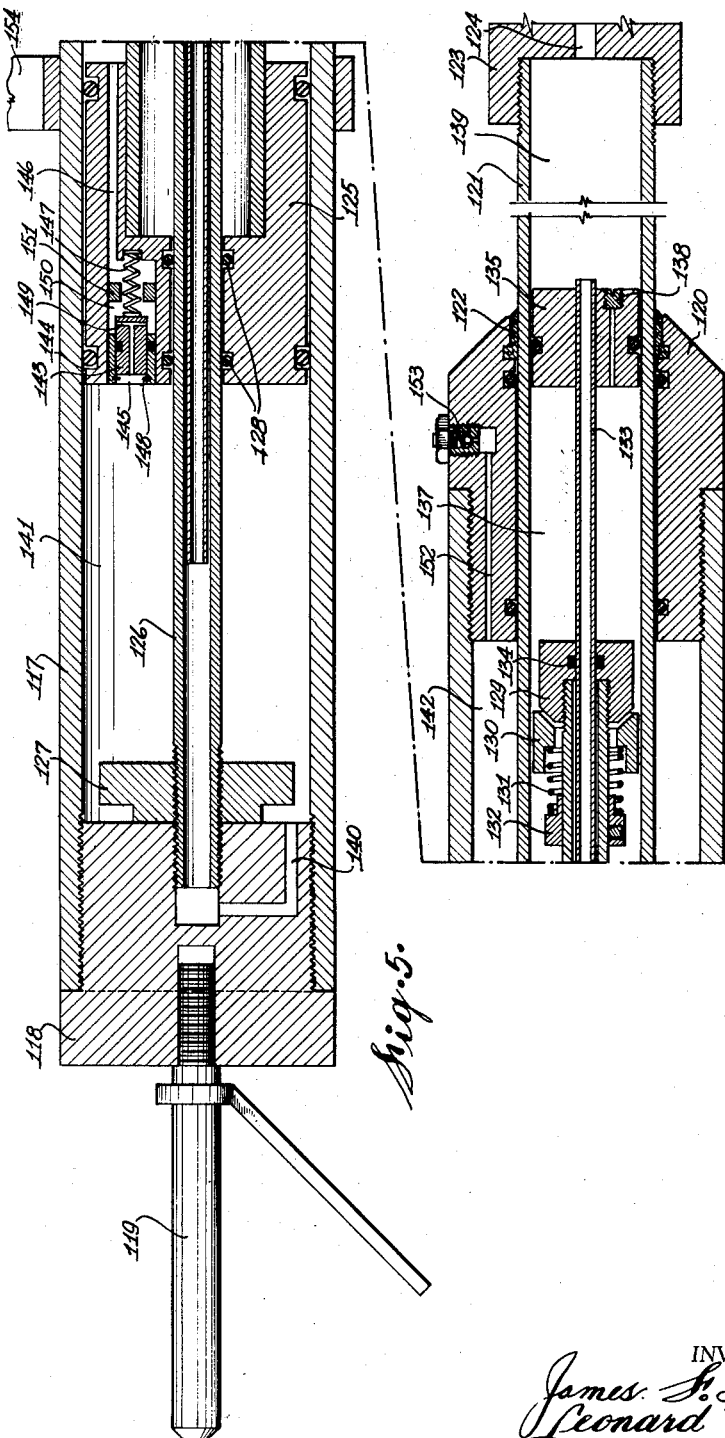

United States Patent Office 3,146,680
Patented Sept. 1, 1964

3,146,680
HYDRAULICALLY CONTROLLED AIR CYLINDER
James F. Hutter and Leonard Kelly, Bancroft,
Ontario, Canada, assignor to K & H Equipment
Limited, Toronto, Ontario, Canada
Filed Feb. 13, 1961, Ser. No. 88,694
10 Claims. (Cl. 92—12)

This invention relates to fluid power actuators and more particularly to a hydraulically controlled air cylinder.

Fluid power linear actuators are of two general types, namely, that in which the fluid used is compressible (air) and that in which the fluid used is incompressible (hydraulic). Each type has advantages and disadvantages.

Air cylinders are widely used because they and their controls are simple and inexpensive, and they may be conveniently connected to a compressed air supply which is commonly available in mines and industrial plants. However, the motion of an air cylinder is load-dependent to a great degree and the speed cannot be controlled nor the piston stopped precisely during its stroke. Furthermore, if an attempt is make to control the speed of an air cylinder by restricting the ports thereof, any temporary restraint imposed by the load during the stroke will result in a pressure build-up, which may "let-go" explosively in a damaging and dangerous manner.

Where precise positioning and control are required a hydraulic actuator is commonly specified. However, this involves the provision of a complete system including motor, pump, relief valve, closed circuit leakproof piping, filter, control valves and a reservoir. Questions of power supply, motor and pump maintenance, line bleeding and leaks make the system more complicated and much more expensive to install and maintain than a comparable air actuator.

An object of the present invention is to provide an improved air cylinder structure which is subject to substantially precise speed and positioning control while having the characteristics of inexpensive manufacture, compactness in size, easy installation, and low cost maintenance.

The invention contemplates the provision of an air cylinder structure in one embodiment of which the speed of the piston may be preset for either direction independently. For example, the rod may be adjusted to extend at, say, two feet per second, and to retract at ten feet per second. Moreover, variations in load will not cause these limits to be exceeded.

In another embodiment of the invention, the direction, speed of travel, and locked position are subject to precise control. This control may be remote, and either manual or part of an automatic system. It may be electrical, mechanical or pneumatic. The latter is very simple and requires the connection of only a small dual air line between cylinder and control, plus a main air supply line to the cylinder.

A further embodiment allows a non-linear motion to be programmed into the air cylinder, so that the rod will follow independent speed/distance curves on extension and retraction. For example, on extension the rod may accelerate, decelerate then accelerate again, while on retraction it may simply be required to accelerate, then decelerate to cushion the end of the stroke. As another example, the non-linear motion may be arranged to open a flap or door in such a manner that the circumferential speed of the door is constant between terminal acceleration and deceleration.

The invention will be described with reference to the accompanying drawings, in which FIGURE 1 is a sectional side elevation of one embodiment of an air cylinder structure in accordance with the invention, FIGURE 2 is an end elevation of the structure shown in FIGURE 1, FIGURE 3 is a partial sectional side elevation of another embodiment of the invention, FIGURE 4 is a partial sectional side elevation of still another embodiment of the invention, FIGURE 5 is a sectional side elevation of an air leg incorporating the structure of the present invention, and FIGURE 6 is a partial side elevation of another embodiment of the invention.

Referring to FIGURES 1 and 2, 1 is a cylinder barrel having a rod end cover 2 at one end thereof and a blind end cover 3 at the other end, such elements being secured together by tie rods 4. An air piston 5 is reciprocally mounted in barrel 1 and is arranged to actuate some external load by means of tubular air piston rod 6 terminated by rod end 7 and associated rod eye or clevis 8. It will be appreciated that these elements correspond to those of a normal air cylinder.

Compressed air is admitted or exhausted through air ports 9 in cover 2 and 10 in cover 3 by means of a standard 4-way air control valve (not shown), to extend or retract the piston rod 6 from the cylinder 1.

Piston 5 is secured to the inner end of rod 6 by means of an anchor ring 11 to which the piston is bolted by means of bolts 14, the anchor ring being attached to the rod by a snap retaining ring 15.

The tubular piston rod 6 is arranged to constitute a hydraulic cylinder which slides backwards and forwards over a hydraulic piston 16 which is held stationary with respect to the main cylinder 1 by a tubular hydraulic piston rod 17 fixed to cover 3 by means of a retaining bolt 18.

An oil reservoir 19 is provided between cover 3 and a floating oil reservoir cover 20 through which the hydraulic piston rod 17 extends. A flexible pipe 21 provides a connection for transfer of air from port 10 to the interior of cylinder 1 through air port 22 in cover 20.

An inner oil transfer tube 23 is held concentrically within hydraulic piston rod 17 by means of pressed bushing 24 and hydraulic rod end 25 brazed to the tube 23. The hydraulic piston rod 17 thus incorporates a central oil passageway 26 connecting a forward oil chamber 27 in piston rod 6 with an oil transfer port 28 in the hydraulic piston rod 17, together with a concentric annular passageway 29 connecting a rear oil chamber 30 between piston rods 6 and 17 via a port 31 in the forward end of piston rod 17 with an oil transfer port 32 in the rearward end of piston rod 17.

Blind end cover 3 contains oil passageways 33 and 34 which connect oil reservoir 19 with respective oil transfer ports 28 and 32, across gasketed junction 35 of the piston rod 17 and cover 3.

An extension needle valve 36 in passageway 34 restricts the flow of oil to the reservoir 19 from rear oil chamber 30, according to its adjustment while a check valve 37 also incorporation in passageway 34 allows oil to flow freely from reservoir 19 to rear oil chamber 30, by-passing the needle valve 36. Similarly, a retraction needle valve 38 restricts the flow of oil to the reservoir 19 from forward oil chamber 27, according to its adjustment, while a check valve 39 allows oil to flow freely in the reverse direction.

Assuming that the air piston rod 6 is in fully retracted position, the action of the air cylinder described is as follows:

Compressed air is admitted through port 10, while port 9 is simultaneously exhausted to atmosphere. Air piston 5 will then have a force applied to it tending to move it towards rod end cover 2. Hydraulic piston 16 will pressurize the oil in rear chamber 30, and since the oil is virtually incompressible, the air piston can only move at a speed determined by the speed of transfer of this oil to reservoir 19. This speed of transfer is governed by the setting of needle valve 36.

As the air piston 5 moves forward, the forward oil chamber 27 increases in volume, and oil is drawn freely from the reservoir 19 through check valve 39 to supply the demand. Thus the extension speed is governed only by the setting of the extension needle valve 36.

It should be noted that the total amount of oil contained in the forward and rear chambers of the hydraulic cylinder increases as the air piston rod 6 is extended, because of the withdrawal of hydraulic piston rod 17. The floating oil reservoir cover therefore moves towards the blind end cover on the extensions stroke, as more oil moves into the forward oil chamber than is returned from the rear oil chamber.

It is apparent too that the air pressure applied on the extension stroke is also applied to the oil system through the oil reservoir cover. Due to the unbalanced pressure areas on the forward and rear sides of the hydraulic piston, a residual unbalanced force assists the extension stroke.

An excessive overload can of course slow the actuator, or indeed stop it entirely, but when the overload is removed the piston simply resumes its controlled rate, unlike the normal air cylinder which can break away wildly. As long as pressurized air is applied through port 10, the air piston will extend to its full limit of travel at the preset rate.

If now port 10 is exhausted to atmosphere and compressed air is admitted to port 9, the air piston will retract, pressurizing the oil in forward oil chamber 27. On the retraction stroke the speed is limited by the flow of oil through retraction needle valve 38 to reservoir 19. At the same time a smaller amount of oil flows freely into rear oil chamber 30 from reservoir 19 through check valve 37, by-passing the restriction of extension needle valve 36. The increasing volume of reservoir oil causes the reservoir cover to slide to meet the air piston as it retracts.

The necessary seals are shown diagrammatically as gaskets and O-ring seals, but it will be understood that the actual seals used in practice will depend on the pressures involved. It is obvious that the hydraulic pressures involved will be greater than the main air pressure in proportion to the effective areas of the piston faces, and this must be taken into account in the design.

Referring now to FIG. 3, the embodiment therein illustrated makes possible the precise control of direction, speed of travel and locked position by remote pneumatic means. In this embodiment, the main cylinder arrangement is exactly the same as that shown in FIGURE 1, apart from the blind end cover, and therefore need not be re-described.

A hydraulic control housing 40 and a pilot control housing 41 are mounted at the rear of the blind end cover 42 with gasket seals, as shown, the whole asembly being secured to the cylinder 1 by suitable tie rods.

The tubular hydraulic piston rod 17 is secured to blind end cover 42 by a retaining bolt 43. Oil is transferred across the gasketed junction 44 from the forward and rear oil chambers 27 and 30, and passes through respective ports 45 and 46 in the cover 42. In a similar manner to the first embodiment, oil may flow freely outwardly from oil reservoir 19 from ports 45 and 46 through check valves 47 and 48 as required, but oil being forced back from the forward oil chamber 27 must pass through a retraction needle valve 49 in cover 42 via retraction needle chamber 50 in housing 40, and oil being forced back to the reservoir 19 from rear oil chamber 30 must pass through an extension needle valve 51 in cover 42 via an extension needle chamber 52 in housing 40.

Needle valve 49 is connected to a retraction control piston 53 mounted in cylinder 54 in housing 40 by a stem 55. Piston 53 reciprocates in cylinder 54 under the influence of an air balance spring 56 in the cylinder on the stem side and against a smaller oil balance spring 57 plus regulated air pressure from a port 58 both on the opposite side of the piston. A vent 59 exhausts the stem side of the piston to atmosphere.

Similarly, extension needle valve 51 is connected to an extension control piston 60 mounted in cylinder 61 in housing 40 by a stem 62. Piston 60 slides in cylinder 61 under the influence of air/oil balance spring 63 on the rear side, and regulated air pressure entering port 64 on the stem side of the piston. A vent 65 exhausts the rear side of the piston to atmosphere.

Pilot control housing 41 contains an air pilot control piston 66 sliding in a cylinder 67 under the influence of regulated air admitted through a port 68 on one side thereof, and opposing air balance spring 69 located on the other side thereof. The side of the cylinder containing the port 68 is sealed by a cap 70, and the opposite side of the cylinder is vented to atmosphere through a vent 71.

A pilot valve 72 has a stem 73 reciprocally mounted in a cylinder 74 in axial alignment with cylinder 67 whereby stem 73 extends into cylinder 67 on the side of piston 66 containing spring 69. Pilot valve 72 has a head 75 (generally conical as shown) and an intermediate reduced diameter portion 76 forming a chamber 77. Pilot valve head 75 seats upon a seat 78 through which chamber 77 communicates (in the open position of the valve) with a cylinder portion 79. A spring 80 between the head 75 and a plug 81 closing cylinder portion 79 urges the valve into valve seating position.

Pilot valve 72 acts as a 3-way valve allowing pressurized air supplied through a port 82 leading to cylinder portion 79 to enter a 4-way valve control port 83 leading from chamber 77 when the pilot valve is raised from seat 78. In such raised position, an exhaust port 84 leading from chamber 77 is sealed off by an O-ring 85. In the absence of an upward force on pilot valve 72, air pressure assisted by spring 80 causes it to descend smartly against seat 78, thus opening control port 83 to atmosphere through port 84.

A standard 4-way air-pilot-controlled air valve (not shown) is connected to control port 83 and ports 9 and 10 of the main air cylinder in such a manner that when port 83 is at atmospheric pressure (pilot closed), compressed air is admitted to port 9, and port 10 is exhausted to atmosphere (retraction stroke). When pilot valve 72 opens and control port 83 is pressurized, the 4-way valve admits compressed air to port 10 and exhausts port 9 (extension stroke).

A main regulated air port 86 serves to supply air from a standard relief type air pressure regulator (not shown) to ports 58, 64, and 68.

The operation of the device described is as follows, assuming that the relieving type air pressure regulator, which acts as a remote pneumatic control, is set at virtually atmospheric pressure.

Pilot piston 66 is at its lowest position due to spring 69, pilot valve 72 is closed and air pressure in the main piston through port 9 is tending to retract the main piston rod 6, retraction needle valve 49 is wide open because of the force exerted on piston 53 by spring 56, oil pressure against stem 55 is balanced by spring 57, and extension needle valve 51 is held closed by piston 60 under the influence of spring 63. In other words a low regulator control air pressure results in controlled retraction of the air cylinder at maximum speed.

If now the regulated air pressure is increased, retraction needle valve 49 gradually closes, extension needle valve 51 remains closed and pilot piston 66 gradually rises towards the stem of pilot valve 72. Retraction speed is thus slowed, and it is arranged that at 40% of full regulated air pressure, spring 56 will be compressed to such an extent that needle valve 49 will close completely. Since no oil can now flow, the main air piston 5 locks in whatever position it is in when both oil valves close off.

Resuming the sequence of events as the regulated air pressure is further increased, pilot piston continues its rise against spring 69 until it meets the stem of pilot valve 72. A small increase of regulated air pressure must now be provided to overcome the air pressure and the effect of spring 80 on the top of valve 72, which will then pop to the open position. When it does so, the main 4-way air control valve is reversed, pressurizing port 10 and exhausting port 9 of the main air cylinder (extension). The main air cylinder will still not move, however, as extension needle valve 51 is held closed by spring 63 at this pressure. It is arranged that the pilot valve will switch as the regulated air pressure reaches about 50% of its total pressure range.

When the regulated air pressure attains 60% of full range value, spring 63 will begin to compress, allowing the extension needle valve 51 to start opening. The main air piston rod 6 will then extend very slowly from its locked position. Increasing the regulated air pressure to its full value opens extension needle valve 51 to its fullest extent, giving the greatest rate of air piston extension.

Briefly then, the pneumatic control provides a small locked zone around the centre of the regulated pressure range, within which the main air control is switched to provide either extension or retraction potential. Beyond this dead zone an increase or decrease of regulated pressure provides varying rates of extension or retraction of the main air piston rod 6.

It should be noted that while the air pilot control is shown in a separate housing 41, for convenience of illustration, in practice it is quite feasible to arrange the entire assembly of hydraulic and air pilot controls, together with the main 4-way valve in one housing. One main air connection then, serves to supply both pilot and 4-way valve, and an outlet may be provided to supply the remote pressure regulator control.

While a pneumatic control has been fully described, it is obvious that other arrangements can be provided to perform the necessary operation of switching the main air from extension to retraction while both hydraulic needle valves are closed, then regulating the speed of operation by control of the appropriate needle valve. For example a simple direct acting lever could be mounted on the air cylinder for manual operation, giving varying speeds of extension and retraction on either side of a "locked" central position. It should be mentioned that when the main air is set for a certain direction, say retraction, only the corresponding retraction needle valve has any control over speed, and whether the extension needle valve is open or closed is of no consequence, since the appropriate check valve is serving as a by-pass, allowing oil to flow freely from the reservoir to that oil chamber which is enlarging. A remote controlled electro-mechanical system could readily be designed to perform the same functions.

FIGURE 4 illustrates a third embodiment which allows a non-linear motion to be programmed into the air cylinder, so that the rod will follow independent speed/distance curves on extension and retraction. Again in this case, the main cylinder arrangement is the same as that shown in FIGURE 1 apart from the blind end cover.

A control housing 87 and a control housing cover 88 are mounted at the rear of a blind end cover 89 with gasket seals as shown as by means of suitable tie rods.

The tubular hydraulic piston rod 17 is secured to the blind end cover 89 by hydraulic piston retaining bolt 90. Oil is transferred across the gasketed junction 91 from the forward and rearward oil chambers 27 and 30, and passes through respective oil transfer ports 92 and 93 in blind end cover 89 and control housing 87. In a similar manner to the cylinders already described, oil may flow freely outwardly from a control oil reservoir 94 in housing 87 through check valves 95 and 96 as required, but oil being forced back from the forward oil chamber 27 must pass a retracting control valve 97 via a retraction valve oil chamber 98 and a circular retraction valve orifice 99, and oil being forced back to control oil reservoir 94 from rear oil chamber 30 must pass an extension control valve 100 via an extension valve oil chamber 101 and a circular extension valve orifice 102.

Retraction valve 97 is secured at one end to a control piston 103 by nut 104, while the other end, bearing O-ring seal 105, slides in a retraction cylinder 106 with a piston motion. The forward end of retraction cylinder 106 is connected to main air port 10 through a port 107.

Similarly extension valve 100 is secured at one end to control piston 103 by a nut 108, while the other end, bearing O-ring seal 109, slides in an extension cylinder 110 with a piston motion. The forward end of extension cylinder 110 is also connected through to main air port 10 through ports 111 and 107.

Control piston 103 sliding in a control cylinder 112 with O-ring seals as shown, bears a central check valve 113, which will open when forced against a stroke limiter 114 screwed into control housing 87. When open, check valve 113 allows oil from make-up reservoir 115 between piston 103 and cover 88 to pass through to control reservoir 94 until piston 103 moves back sufficiently to allow check valve 113 to re-seat. Oil for make-up reservoir 115 is supplied through an oil transfer port 116 from main oil reservoir 19 located as before in the main cylinder and sealed by floating reservoir cover 20.

Briefly, the action of the control is to use the volume differential of the forward and rear oil chambers 27 and 31, to translate motion of the main piston 5, into a proportional but much smaller movement of control piston 103. Extension and retraction valves 100 and 97 are directly connected to piston 103, and are contoured to present varying diameters along their stroke, as shown. For each position of the main piston along its stroke there is a corresponding position of the control piston, and thus a particular restrictive value of the control orifice 102 and 99. By appropriate contouring of the control valves it becomes possible to programme independent retraction and extension speed/distance curves into the movement of the main air piston 5.

Examining the action in more detail, assume that the main piston rod 6 is in its fully retracted position. Large forward oil chamber 27 then contains a minimum volume of oil, smaller rear oil chamber 31 contains a maximum volume of oil, control oil chamber 94 has enlarged to accept the differential volume of the rear and forward oil chambers, and control piston 103 and associated control valves are at the full backward limit of their stroke. Oil displaced from make-up reservoir 115 by rearward movement of piston 103 has passed through port 116 to main oil reservoir 19, and floating oil reservoir cover 20 is thus fully forward.

If pressurized air is now admitted to port 10, and port 9 is exhausted to atmosphere, main piston rod 6 will extend as previously described, forcing oil from rear oil chamber 31 through extension control orifice 102 into control oil reservoir 94. At the same time a greater quantity of oil is being freely withdrawn from control reservoir 94, through check valve 96, to fill expanding forward oil chamber 27. The net effect is that piston 103 and associated retraction and extension valves 97 and 100 move forward, the instantaneous speed of extension of the main piston rod 6 being determined solely by the size of the annular orifice existing between extension valve 100 and extension orifice 102, at the point of travel in question. Floating oil reservoir cover 20 of course moves towards blind end cover 89 in response to the transfer of oil through port 116 to make-up reservoir 115.

The movement of air piston 5 along hydraulic piston rod 17, results in a slight loss of oil through the seal, which although a minute quantity per stroke, nevertheless becomes significant over several million operations. It can readily be appreciated that a loss of oil through this seal will be reflected in a restoratory forward movement of control piston 103 and control valves 97 and 100, which would then no longer have strokes "tracking" with the main air piston. Consequently the speed of travel would not correspond to the programmed speed at a given distance.

The action of check valve 113 and stroke limiter 114 overcomes this difficulty of oil loss. To illustrate, assume that a volume of oil X is lost during each retraction/extension cycle. Now as the main piston 6 extends to its limit after one cycle, control piston 103 will tend to a limit further forward than on the previous stroke to compensate, causing stroke limiter 114 to unseat check valve 113. The air pressure existing in port 10 and transmitted to the forward ends of the control valves 97 and 100 through ports 105 and 111, will then urge the piston 103 to displace a volume of oil X from make-up reservoir 115, through check valve 113 into control reservoir 94, when the check valve 113 will again close.

In this manner the control valves will always set to precisely the same position whenever the main piston is fully extended. Main oil reservoir 19 has sufficient capacity to make up oil loss and allow the cylinder to operate at its programmed settings, without attention, for many millions of cycles, or virtually the life of the seals.

The action of the system on the retraction stroke is rather similar to the extension stroke already described. Assume that the main air piston rod 6 is fully extended. On pressurizing port 9 and exhausting port 10, the main air piston 5 will tend to move towards blind end cover 89, pressurizing the oil in forward oil chamber 27 and forcing it through retraction orifice 99 into control reservoir 94. At the same time a smaller quantity of oil is being withdrawn from control reservoir 94, through check valve 95 to fill expanding rear oil chamber 31. The net effect is that piston 103 and associated retraction and extension valves 97 and 100 move away from blind end cover 89. The instantaneous speed of retraction of the main piston rod 6 is determined solely by the size of the annular orifice existing between retraction valve 97 and retraction orifice 99, at the point of travel in question. Floating oil reservoir cover 20 moves away from blind end cover 89 on the retraction stroke, in response to the transfer of oil through port 116 from make-up reservoir 115.

The air cylinder described may be employed in many phases of industrial activity. Compressed air is almost universally available throughout industry, and it is also a fact that there is a great and increasing need for simple and precise control mechanisms to complement this convenient power medium. In the case of linear actuators, many separate complete and expensive hydraulic systems have had to be installed in situations where air power is readily available not because a greater force than air is required, but because the normal air control means is inadequate. The structure described is designed to incorporate a control means which will render simple and inexpensive the use of actuators of the air power type in much wider application than has heretofore been possible. By way of example, the mining industry is representative of one field in which the air cylinder of the present invention would be particularly useful.

A mine plant typically consists of two distinct parts—the mining or extraction operation, either underground or on surface, and the mill or concentration plant which is essentially a specialized chemical processing operation.

Compressed air power is piped throughout virtually every underground mine in the world to every working place. Apart from haulage, and sometimes even here, air is the prime mover. It is used to power the rock drills, ventilation doors, chute gates, car dumpers, chain gates, loading pocket controls and the like. While convenient, air power can be hazardous, and many accidents are directly or indirectly attributable each year to the uncontrollable explosive characteristics of raw air power.

Ventilation or fire doors are used in many places throughout a mine. They are usually operated by dual controls located at points some 100 feet on opposite sides of the door for the convenience of ore train operators. A substantial differential pressure build-up of ventilation air generally occurs against the door. If an air cylinder is used to operate the door, a considerable force is required to start it opening and almost full air pressure builds up in the cylinder before any movement occurs. As soon as the door opens sufficiently for the ventilation air pressure against the door to be relieved, the door is flung open violently by the pressure build-up in the cylinder, and it is obvious that restricting the air ports to the cylinder will not help this appreciably.

The doors must be made substantial and heavy to withstand the violent action and this in turn increases the inertia, resulting in high cost, high maintenance and greater danger of injury to personnel accidentally getting in the way. A hydraulically controlled air cylinder would be particularly suitable for operation of such doors.

As another example, long-stroke air cylinders or "pusher legs" are quite generally used to support and position rock drills, and supply the considerable force required for effective rock comminution by the percussive drill. In drifting or crosscutting, holes are drilled horizontally in a present pattern into the face for loading and blasting. The horizontal pressure and upward supporting force is supplied by an air leg, the piston of which is attached to the machine and may swivel in a vertical plane, while the cylinder itself slants backwards and downwards to a spike-like termination which is driven into the floor of the drift.

Apart from the difficulty of initially lining up the holes because of lack of precise control, there is a continual danger of the drill steel breaking once the hole is established and heavy pressure is being applied. Drill steel is subject to constant flexing and hammering, and eventually fatigues, fracturing suddenly. Relieved of restraint, the air leg explodes under full line pressure, pulling the drill operator towards the face and possibe impalement on the broken drill steel, unless his reactions are fast enough to release his grip on the machine.

Referring now to FIGURE 5, an air leg is therein illustrated which is designed for safe, controllable operation and increased life.

A main air cylinder barrel 117 is terminated at one end by a blind end cap 118 in which an external ground spike 119 is screwed. A rod end cap 120 is screwed into the other end and forms the bearing through which a tubular air piston rod 121 extends and retracts, sealed by O-rings as shown and including a molded-rubber rod end wiper 122.

A standard rock drill fitting 123 is screwed into the external end of tubular air piston rod 121, and includes an air inlet and exhaust orifice 124, together with pressure and relief valves and swivel attachment to the rock drill (not shown). An air piston 125 is a pressure fit on the internal end of air piston rod 121, and slides in cylinder barrel 117 on O-ring seals as shown.

A tubular hydraulic piston rod 126 is screwed into blind end cap 118 and locked by a nut 127. Air piston 125 is centrally drilled as shown to allow sliding movement along hydraulic piston rod 126, and O-rings 128 provide seal and wiping action. The other end of piston rod 126 is terminated by a hydraulic piston seat 129. A hydraulic piston 130 is held in contact with seat 129 by a light piston spring 131 reacting against a set collar 132 which is secured to piston rod 126.

An air transfer tube 133 is free to slide in tubular hydraulic piston rod 126 and through a central drilling in hydraulic piston seat 129, which is provided with O-ring seal 134. Transfer tube 133 is brazed to a floating oil reservoir cover 135 which may slide in tubular air piston rod 121 on O-ring seal as shown. The arrangement described provides a rear oil chamber 136 in piston rod 121 between pistons 125 and 130 and a forward oil chamber 137 between piston 130 and cover 135. A bleeder 138 is provided as an air bleed when filling rear oil chamber 136 and forward oil chamber 137 with oil. A sealed air passage is thus provided from the external supply via orifice 124 into an air inlet chamber 139 in piston rod 121 thence through transfer tube 133 into tubular hydraulic piston rod 126, and finally out of an orifice 140 in blind end cap 118 main air pressure chamber 141 in main cylinder 117 between cap 118 and piston 125.

A controlled air passageway is provided in piston 125 from main air pressure chamber 141 to forward air chamber 142 in the main cylinder forwardly of piston 125. This passageway is provided by a shuttle valve arrangement in piston 125 and comprising an exhaust shuttle valve 143 slidingly mounted in a valve liner 144 fixed in a hole 145 drilled in the pressure chamber side of piston 125. A port 146 provides communication from the hole 145 to the chamber 142. A spring 147 urges valve 143 in one direction against a snap retaining ring 148 in liner 144 adjacent the pressure chamber end thereof, and it will be apparent that when the pressure chamber 125 is depressurized the valve 143 will be held in such position by spring 147. In this backward position, air may pass through transfer ports 149 formed in the valve via a transfer chamber 150 formed in hole 145 into transfer port 146.

Movement of valve 143 in the other direction is limited by a valve seat 151 provided in hole 145. It will be apparent that the valve 143 may be forced by air pressure against seat 151, thus breaking the connection between main pressure chamber 141 and forward air chamber 142.

A relief port 152 is provided in rod end cap 120 to connect forward air chamber 142 with a low pressure relief valve 153. A handle 154 is provided for moving and positioning the air leg.

The action of the air leg described is as follows:

Assume first that the air leg is in its fully retracted position, then air piston 125 is close to blind end cap 118, shuttle valve 143 is held against retaining ring 148 by spring 147, rear oil chamber 136 is at its maximum volume, forward oil chamber 137 is at its minimum volume with hydraulic piston seat 129 located close to floating oil reservoir cover 135, air inlet chamber 139 is at its minimum value, and low pressure relief valve 153 is closed.

If now compressed air is admitted at inlet 124, it is transmitted through transfer tube 133 and orifice 140 of hydraulic piston rod 126, into air pressure chamber 141. Orifice 140 is considerably larger than shuttle valve transfer ports 149, and furthermore forward air chamber 142 is relieved at a few pounds above atmosphere by relief valve 153, consequently shuttle valve 143 closes against seat 151 when the differential pressures on opposite faces of the shuttle valve reach a certain value determined by spring 147.

The air pressure against the face of piston 125 tends to move it away from blind end cover 118, extending air piston rod 121 from the cylinder. However, the speed of movement is limited by the speed with which the pressurized oil in rear oil chamber 136 can leak past the controlled clearance provided between piston 130 and its bore in piston rod 121. It will be apparent that a sealed piston with an internal leak orifice would be an alternative arrangement.

As the piston rod 121 extends and hydraulic piston rod 126 is withdrawn from rear oil chamber 136, there is a net movement of reservoir cover 135 away from rock drill fitting 123, to compensate for the volume difference between piston rod 126 and air transfer tube 133. On this extension stroke, air is forced out of forward air chamber 142 through relief valve 153.

It is important to realize that it is very undesirable, in an atmosphere of abrasive rock dust, to allow outside air to be drawn anywhere into the cylinder on the retraction stroke, although this is common practice. A controlled air leak through the air piston may be used in an attempt to overcome this disadvantage but this is wasteful of air power. The combination of shuttle valve and low pressure relief valve in the arrangement described substantially eliminates dust contamination and air waste.

The action on retraction will now be described with orifice 124 exhausted to atmosphere through an external valve (not shown) under the control of the rock drill operator. As the pressure in main pressure chamber 141 drops to a certain pressure determined by spring 147, shuttle valve 143 opens, allowing the air to exhaust through port 146 into forward air chamber 142 as well as through orifice 140. In this manner, no opposition is offered to the normal gravity retraction of the air piston by any vacuum effect in forward air chamber 142, and no air is drawn in from outside. At the same time the expansion of rear oil chamber 136 behind hydraulic piston 130, lifts piston 130 off seat 129 against light spring 131, allowing oil to flow freely from forward oil chamber 137 as required, putting virtually no compressive force on hydraulic piston 130.

Floating end cover 135 responds to the retraction stroke by moving towards rock drill fitting 123, as a consequence of the hydraulic piston rod moving into the rear oil chamber and replacing the effect of smaller diameter air transfer tube 133.

The safe controlled maximum speed of extension of this hydraulically controlled air leg is of major significance from the point of view of safety and convenience. However, an additional advantage derives from the full sealing provided in the structure described. The mechanism is completely isolated from the water and dust contaminated air, and, free of abrasion particles, the seals last their full rated life. This is many times greater than the life of seals working in the degrading conditions present in heretofore employed drill air legs.

Furthermore, in this hydraulically controlled air leg, the high frequency vibrations caused by the percussive nature of the drill are substantially oil-damped, and taken up at the swivel joint rather than by movement of the air piston. This high frequency movement of the piston in the dust-contaminated cylinder of a standard air leg is the cause of the very high rate of wear in the leather seals employed. This wear is so rapid that it is common practice to provide the miner with spare seals which he may change himself during the shift, at no small cost in downtime.

In many places in a mine, air cylinders are used to activate the gates or chains which control rock flow through openings, and it is a distinct advantage to have for this purpose a device which can do more than simply open violently or close violently.

Shaft loading pockets, for example, are filled to a certain level before the rock is dumped into the hoisting skip, and it is important that this level should not be exceeded, because of possible spillage into the shaft and hoist overload, nor should it be lightly loaded if optimum hoisting efficiency is to be achieved.

This pocket loading is normally accomplished by an operator controlling a two-way air cylinder, to open and close the main ore pass gate. It is obvious that with only two stable positions of the air cylinder available (gate open/gate closed), complicated by varying running qualities of the rock, delicacy of control is very difficult and efficient loading depends very much on the experience, judgment, skill and alertness and reaction of the operator. The use of a remote controlled cylinder such as illustrated in FIGURE 2, allowing precise locked positioning, and variable speed of gate opening and closing would substantially ameliorate the difficulties and improve the performance at this vital point in the mine. It would also lend itself to completely automatic skip-loading control.

Still another modification is illustrated in FIGURE 6 wherein the locked position of the actuator is subject to control by the amplitude of a remote signal source. In this instance, for every valve of a control signal there is a corresponding locked and stable position of the piston, and a change in the signal will cause the piston to move to the new required position at a controlled speed.

A fluid control housing 155 and a make-up reservoir cover 156 are mounted at the rear of a blind end cover 157 with gasket or O-ring seals as shown, such assembly being secured to the cylinder barrel 1 by suitably arranged tie rods, not shown.

Tubular hydraulic piston rod 17 is secured to blind end cover 157 by hydraulic piston retaining bolt 18. Oil is transferred across the gasketed junction 35 from the forward and rear oil chambers 27 and 30, and passes through appropriate oil transfer ports 158 and 159 in blind end cover 157 and control housing 155. In a similar manner to the cylinders already described, oil may flow freely outward from a control reservoir 160 in housing 155 through check valves 161 and 162 as required, but oil being forced back from the forward oil chamber 27 must pass a retraction control valve 163 via a retraction oil chamber 164 and a circular retraction valve orifice 165, and oil being forced back to control oil reservoir 160 from rear oil chamber 30 must pass an extension valve 166 via an extension valve oil chamber 167 and a circular extension valve orifice 168.

Retraction valve 163 is connected to a retraction control piston 169 by a stem 170, with the provision of O-ring seals as shown. Piston 169 slides in a cylinder 171, closing valve 163 when pressurized air is admitted to a valve chamber 172 through an oil control air port 173 from a normally-open, solenoid operated, 3-way air valve 174. A vent 175 exhausts the stem side of piston 169 to atmosphere.

Similarly, extension valve 166 is connected to an extension control piston 176 by a stem 177, with the provision of O-ring seals as shown. Piston 176 slides in a cylinder 178, closing valve 166 when pressurized air is admitted to a valve chamber 179 through oil control air port 173 via a piston retaining bolt recess 180. Both extension and retraction valves thus close in unison whenever oil-control air valve 174 is de-energized.

A main control piston 181 sliding in a control cylinder 182 with O-ring seal as shown, bears a control check valve 183 which will open when forced against a stroke limiter 184 screwed into control housing 155. When open, check valve 183 allows oil from a make-up reservoir 185 to pass through a port 186 into control reservoir 160 until piston 181, under the influence of a spring 187, moves back sufficiently to allow check valve 183 to reseat. Oil from make-up reservoir 185 is supplied through an oil transfer port 188 from main oil reservoir 19 located as before in the main cylinder and sealed by floating reservoir cover 20.

A tubular extension 189, terminated by a screwed end cover 190, is screwed onto control piston 181 and slides back and forth through O-ring seal 191 in make-up reservoir cover 156. A switching piston 192 slides in a short stroke cylinder bore 193 machined in the rear of tubular extension 189 with O-ring seals as shown. A hollow stem 194 of piston 192 slides through an O-ring seal in end cover 190, and serves to actuate a switch 195. Switch 195 comprises a control lever 196 pivoted at 197 to an arm 198 fixed to cover 190 and biased in one direction by a spring 199.

An air balance spring 200 is compressed between the forward face of piston 192 and a vented spring retainer 201. The position of retainer 201 is adjusted by a spring retainer rod 202, screwed and locked onto a rod support 203 which is firmly attached to make-up reservoir cover 156.

A sealed air chamber 204 in the stem side of piston 192 communicates with a control air port 205 on reservoir cover 157 via a flexible pipe 206 and a port 207 on end cover 190. A remote regulated pressure air source 208 is connected to control air port 205 and furnishes a pneumatic control signal which positions the main air piston rod 6, as will be later described.

The switch spring 199 maintains switch control lever 196 in contact with piston stem 194. Motion of stem 194, amplified by the lever action of switch 195, is transmitted to a common power contact 209 carried by switch lever 196. Opposing insulated contacts 210 and 211 are firmly positioned by a contact support 212 screwed onto end cover 190, in such a manner that main power contact 209 makes contact with either 210 or 211 on either side of a neutral "all solenoids de-energized" position.

Electrical connections as indicated are taken out from the contacts in a convenient manner, and a cover 213 keeps dust out of the rear end.

Contact 210 is connected to a solenoid 214 of a 3-way normally-open air valve 215, which exhausts main cylinder port 10 to atmosphere when energized. Contact 211 is connected to a solenoid 216 of a 3-way normally-open air valve 217, which exhausts main cylinder port 9 to atmosphere when energized. A solenoid 218 of oil control air valve 174 is in series with the parallel arrangement of solenoids 214 and 216, and is therefore energized when either 214 or 216 are energized. Main power supply 219 is shown diagrammatically.

As diagrammatically indicated, valve 174 has a line 220 to port 173, a pressurized air supply line 221, and an exhaust to atmosphere line 222; valve 217 has a line 223 to port 9, a pressurized air supply line 224, and an exhaust to atmosphere line 225; and valve 215 has a line 226 to port 10, a pressurized air supply line 227, and an exhaust to atmosphere line 228.

Briefly, the action of the control is to use the volume differential of the forward and rear oil chambers 27 and 30, to translate motion of the main piston 5, into a proportional but much smaller movement of control piston 181. A continuous comparison is made between the position of control piston 181, and the amplitude of a remotely controlled position signal, thus generating an error signal which activates control means to cancel the error and position the air piston rod in accordance with the demands of the control signal.

Examining the action in more detail, assume that a low valve of control air pressure has caused the main piston rod 6 to take up a stable locked position at the limit of its retraction stroke. Large forward oil chamber 27 then contains a minimum volume of oil, smaller rear oil chamber 30 contains a maximum volume of oil, control oil reservoir 160 has enlarged to accept the differential volume of the rear and forward oil chambers, control piston 181 and tubular extension 189 are at the full backward limit of their stroke, the force of spring 200 against switching piston 192 is at a minimum and balanced by regulated air pressure from control 208, piston 192 and associated switch 195 are in mid-position, all solenoids are de-energized allowing full air pressure on both sides of main air piston 5 and on both oil valves 163 and 166 holding them closed.

If it is now desired to extend the main air piston rod 6 to a specific position, an appropriate increase of regulated pressure is set at the output of control 208. The increased pressure against switching piston 182 overbalances spring 200 and moves the piston the very small distance to its forward limit of travel, closing contacts 209 and 211, and energizing solenoids 216 and 218. Solenoid 216 operates air valve 217, exhausing port 9 to atmosphere and allowing line pressure through port 10 to urge main air piston 5 forward. Solenoid 218 operates air valve 174, exhausting port 173 to atmosphere and allowing oil control valves 163 and 166 to open.

Main piston rod 6 will now extend, forcing oil from rear oil chamber 30 through extension control orifice 168 into control reservoir 160. At the same time a greater quantity of oil is being freely withdrawn from control reservoir 160 through check valve 162 to fill expanding forward oil chamber 27. The net effect is that piston 181 and associated parts move forward, and floating oil reservoir cover 20 moves towards blind end cover 157 in response to the transfer of oil through port 188 to make-up reservoir 185. As before, the speed of extension of the main air piston rod 6 is limited by the oil control orifice 168.

As control piston 181 moves forward, spring 200 is compressed against spring retainer 201. When this increasing spring force and the counter-force established by the controlled air pressure approach balance, switching piston 192 floats to its mid-position associated switch 195 parts the contacts 209 and 211 de-energizing all solenoids, oil valves 163 and 166 close and lock main air piston rod 6 in the new position, and air is admitted to port 9 pressurizing both sides of air piston 5 in readiness for positive movement in response to the next command.

The action of limiter 184 and check valve 183 are as described previously in connection with FIGURE 4. They compensate for long-term oil loss by setting piston 181 to precisely the same position whenever the main piston reaches a predetermined limit of extension.

The action of the system when it is required to retract the main air piston is essentially the reverse of the extension movement already described. An appropriate decrease of regulated pressure is set at the output of control 208. The decreased pressure against switching piston 192 allows spring 200 to move the piston to its rearward limit of travel, closing contacts 210 and 209, and energizing solenoids 214 and 218. Solenoids 214 operates air valve 215, exhausing port 10 to atmosphere and allowing line pressure port 9 to urge main air piston 5 to retract. Solenoid 218 operates air valve 174, exhausting port 173 to atmosphere and allowing oil control valves 163 and 166 to open.

Main piston rod 6 will now retract, forcing oil from forward oil chamber 27 through retraction control orifice 165 into control reservoir 160. At the same time a smaller quantity of oil is being withdrawn from control reservoir 160 through check valve 161 to fill expanding rear oil chamber 30. The net effect is that piston 181 and associated parts move rearward, and floating oil reservoir cover 20 moves forward in response to the transfer of oil through port 188 from make-up reservoir 185. As before the speed of retraction of the main air piston rod 6 is limited by oil control orifice 165.

As control piston 181 moves rearward towards cover 213, the tension of spring 200 is relieved. When the decreasing spring force and the counter force established by the controlled air pressure approach balance, switching piston 192 floats to its mid-posiiton, de-energizing all solenoids and locking main air piston 6 in the required position as previously described.

While the example disclosed uses a combined pneumatic-electric control, it is obvious that a fully pneumatic control could readily be designed. The amplified movement of switching piston 192 around the balance point would, in this case, operate the pilots of the main air valves directly.

A fully electrical control would be equally easy to design. A wide variety of input and output transducers with associated controls are available, and would allow analogue information concerning some process to produce the required continuously variable linear actuation of this cylinder.

This system may be used in mechanical or electrical feed back circuits. For instance the shutters on large mine ventilation fans may be regulated by this means. Fan output temperatures must not fall below a certain limit regardless of variations in the outside air down to sub-zero temperatures. The most economical use of heater and fan capacity under all conditions can only be achieved by controlling the shutters according to output temperature.

As another example, continuous proportioning of materials may be accomplished by feeding back belt weightometer information to control gates actuated by this type of cylinder.

Large valves, and mechanisms of various types, which require a proportional linear movement operated remotely are adaptable to this type of control.

We claim:

1. A hydraulically controlled air cylinder structure comprising a main air cylinder having a rod end cover at one end thereof and a blind end cover at the other end thereof, an air piston reciprocally mounted in said air cylinder, a tubular air piston rod extending through said rod end cover and having a forward end disposed exteriorly thereof and a rear end fixed to said air piston, said piston rod having alternate extension and retraction strokes in response to air pressure on said piston, and hydraulic means for controlling and adjusting the speed of said strokes comprising a hydraulic piston in said piston rod and having a fixed position relative to said air cylinder, said piston rod having therein a forward oil chamber and a rear oil chamber, an oil reservoir in said air cylinder in communication with said chambers, the capacity of said chambers being responsive to movement of said piston rod relative to said hydraulic piston, valve means controlling oil flow between said chambers through said reservoir, and a floating reservoir cover in said air cylinder variably controlling the capacity thereof.

2. A hydraulically controlled air cylinder structure comprising a main air cylinder having a forward end, a rod end cover on said forward end, a rear end, a blind end cover on said rear end, an air piston reciprocally mounted in said air cylinder, a tubular air piston rod extending through said rod end cover and having a rear end fixed to said air piston, said cylinder having a main air port therein adjacent each end thereof, said piston rod having extension and retraction strokes in response to air pressure on said piston by means of admission and exhaustion of air through said ports, and hydraulic means for controlling the progress of said strokes comprising a hydraulic piston in said air piston rod, a tubular hydraulic piston rod having one end fixed to said hydraulic piston and its other end fixed to said blind end cover, a floating oil reservoir cover reciprocally mounted on said hydraulic piston rod between said air piston and said blind end cover, and oil reservoir defined by said reservoir cover and said blind end cover, said air piston rod having therein a forward oil chamber of differential volume disposed between the forward end thereof and said hydraulic piston, and rear oil chamber of differential volume disposed between said hydraulic piston and said air piston, said hydraulic piston rod having therein a first oil passageway communicating with said forward oil chamber and a second oil passageway communicating with said rear oil chamber, means forming a passage leading from each said passageway to said reservoir, a valve in each said passage controlling flow therethrough, a one-way valve leading from said reservoir to each said passage, and pneumatically operable means controlling the actuation of said passage valves.

3. A hydraulically controlled air cylinder structure as defined in claim 2, said pneumatically operable means comprising a control housing, a piston connected to each said passage valve and reciprocally mounted in said housing, a pilot valve mounted in said housing and operable to control said main air ports, a piston engageable with said pilot valve to operate said pilot valve, and an air passage communicating with said valve pistons and said pilot valve operating piston.

4. A hydraulically controlled air cylinder structure as defined in claim 2, said pneumatically operable means comprising a control housing, a piston connected to each said passage valve and reciprocally mounted in said housing, a spring biasing one of said valve pistons in a closing direction, a spring biasing the other of said valve pistons in an opening direction, a pilot valve mounted in said housing and operable to control said main air ports, a piston engageable with said pilot valve to operate said pilot valve, and an air supply passage having a branch communicating with one of said valve pistons to move it in an opening direction, a branch communicating with the other of said valve pistons to move it in a closing direction, and a branch communicating with said pilot valve piston to move it in a pilot valve operating direction.

5. A hydraulically controlled air cylinder structure comprising a main air cylinder having a rod end cover at one end thereof and a blind end cover at the other end thereof, an air piston reciprocally mounted in said air cylinder, a tubular air piston rod extending through said rod end cover and having a forward end disposed exteriorly thereof and a rear end fixed to said air piston, said piston rod having alternate extension and retraction strokes in response to air pressure on said piston, and hydraulic means for controlling and adjusting the speed of said strokes comprising a hydraulic piston in said piston rod and having a fixed position relative to said air cylinder, said piston rod having therein a forward oil chamber and a rear oil chamber, an oil reservoir in said air cylinder, a passage leading from each said chamber to said reservoir, a valve in each said passage controlling flow therethrough, a one-way valve leading from said reservoir to each said passage, each said passage having an orifice, each said valve being movable to adjust the size of said orifice and thereby control flow therethrough, a control cylinder, a control piston reciprocally mounted in said control cylinder and carrying said valve, and means providing communication between each of said chambers with said cylinder on one side of said control piston.

6. A hydraulically controlled air cylinder structure as defined in claim 5, each said valve being of varying cross-sectional size for adjustment of the size of said orifice.

7. A hydraulically controlled air cylinder structure as defined in claim 5, including a passage for make-up liquid extending through said control piston, a valve controlling said make-up passage, and means for periodically actuating said make-up passage valve.

8. A hydraulically controlled air cylinder structure comprising a main air cylinder having a forward end, a rod end cover on said forward end, a rear end, a blind end cover on said rear end, an air piston reciprocally mounted in said air cylinder, a tubular air piston rod extending through said rod end cover and having a rear end fixed to said air piston, said cylinder having a main air port therein adjacent each end thereof, said piston rod having extension and retraction strokes in response to air pressure on said piston by means of admission and exhaustion of air through said ports, and hydraulic means for controlling the progress of said strokes comprising a hydraulic piston in said air piston rod, a tubular hydraulic piston rod having one end fixed to said hydraulic piston and its other end fixed to said blind end cover, a floating oil reservoir cover reciprocally mounted on said hydraulic piston rod between said air piston and said blind end cover, and oil reservoir defined by said reservoir cover and said blind end cover, said air piston rod having therein a forward oil chamber of differential volume disposed between the forward end thereof and said hydraulic piston, and a rear oil chamber of differential volume disposed between said hydraulic piston and said air piston, said hydraulic piston rod having therein a first oil passageway communicating with said forward oil chamber and a second oil passageway communicating with said rear oil chamber, a control housing having a control cylinder, a control piston in said control cylinder, an oil control passage communicating with each of said passageways and said control cylinder on one side of said control piston, and a passage communicating with said reservoir and the other side of said control piston; valve means controlling each of said oil control passages to position said control piston in response to flow of oil to said control cylinder through said passages and thereby in accordance with the volume differential of said chambers, valve means controlling each of said air ports, means providing a control signal, a control device for actuating all of said valve means, and means responsive to the amplitude of said control signal and the position of said control piston for operating said control device.

9. A hydraulically controlled air cylinder as defined in claim 8, said control device comprising electrical means for actuating each of said valve means, a switch controlling said electrical means, reciprocally mounted member movable to actuate said switch, means for applying a pneumatic pressure of predetermined degree to move said member in one direction, and means responsive to the position of said control piston for applying pressure to move said member in the opposite direction, said member thereby having a position determined by the degree of said pneumatic pressure and the position of said control piston.

10. A hydraulically controlled air cylinder structure comprising a main air cylinder having a rod end cover at one end thereof and a blind end cover at the other end thereof, an air piston reciprocally mounted in said air cylinder, a tubular air piston rod extending through said rod end cover and having a forward end disposed exteriorly thereof and a rear end fixed to said air piston, said piston rod having alternate extension and retraction strokes in response to air pressure on said piston, and hydraulic means for controlling and adjusting the speed of said strokes comprising a hydraulic piston in said piston rod and having a fixed position relative to said air cylinder, said piston rod having therein a forward oil chamber and a rear oil chamber, an oil reservoir in said air cylinder, a passage leading from each said chamber to said reservoir, a valve in each said passage controlling flow therethrough, a one-way valve leading from said reservoir to each said passage, and a floating reservoir cover in said air cylinder variably controlling the capacity thereof.

References Cited in the file of this patent

UNITED STATES PATENTS

| | | |
|---|---|---|
| 926,644 | Davidson | June 29, 1909 |
| 2,078,780 | Slater | Apr. 27, 1937 |
| 2,193,736 | Onions | Mar. 12, 1940 |
| 2,624,318 | Walder | Jan. 6, 1953 |
| 2,664,859 | Green | Jan. 5, 1954 |
| 2,701,551 | Gunning et al. | Feb. 8, 1955 |
| 2,860,604 | Morf | Nov. 18, 1958 |